United States Patent [19]
Davies

[11] Patent Number: 4,670,076
[45] Date of Patent: Jun. 2, 1987

[54] METHOD OF FABRICATING VISIBLE FILE POCKET SUPPORT PANEL

[76] Inventor: Alan F. Davies, 128 West 3rd Avenue, Vancouver, B.C., Canada, V5Y 1E9

[21] Appl. No.: 698,074

[22] Filed: Feb. 4, 1985

Related U.S. Application Data

[62] Division of Ser. No. 461,538, Jan. 27, 1983, Pat. No. 4,551,934.

[51] Int. Cl.[4] .................. B32B 31/04

[52] U.S. Cl. .................. 156/244.11; 156/293; 40/376; 40/388; 40/390; 40/392; 40/400; 40/405; 40/535; 40/537; 493/947

[58] Field of Search .................. 156/227, 244.11, 258, 156/293; 40/376, 388, 389, 390, 391, 392, 400, 405, 530, 533, 535, 536, 537; 493/947

[56] References Cited

U.S. PATENT DOCUMENTS

| | | | |
|---|---|---|---|
| 1,142,728 | 6/1915 | Rand | 40/405 |
| 1,729,908 | 10/1929 | Wood | 40/392 |
| 1,890,182 | 12/1932 | Hunter | 40/535 |
| 3,374,794 | 3/1968 | Reed | 40/535 |
| 3,469,333 | 9/1969 | Roberts | 40/535 |
| 3,716,145 | 2/1973 | Gutierrez | 40/535 |
| 4,231,176 | 11/1980 | Ryan | 40/535 |

*Primary Examiner*—Caleb Weston
*Attorney, Agent, or Firm*—Hughes & Cassidy

[57] ABSTRACT

A method for fabricating a visible file pocket support panel (120) for use in supporting "n" (where "n" is any whole integer) file pockets (100) having front and back upper and lower pocket tips (102, 103, 104, 105) coextensive with the upper and lower edges of the file pocket and a hinge pin (110) extending transversely through the file pocket (100) adjacent the upper edge (108) thereof and projecting laterally beyond the sides of the file pocket with hinge elements (112) nonrotatably mounted on the projecting ends of the hinge pin (110); and, which can be readily fabricated from two basic lightweight elements—viz.: (i) a rectangular panel bottom (121) defining a laterally extending peripheral flange (122), and including a file pocket support ramp (124) having a depth approximately equal to the vertical height of the file pockets (100) and extending rearwardly and downwardly from the front edge of the panel bottom (121) towards, but terminating short of, the rear edge of the panel bottom, and wherein the panel bottom (121) extends rearwardly from the rear edge of the support ramp (124) by a distance approximately equal to "n" (where "n" equals any whole integer equal to the number of file pockets to be supported) times the vertical height of the hinge elements (112) projecting laterally from the hinge defining edge of each file pocket (100); and (ii), a peripheral edge defining channel member (125) having an E-shaped cross-sectional configuration and an upstanding vertical flange (131).

8 Claims, 14 Drawing Figures

FIG. 4
PRIOR ART
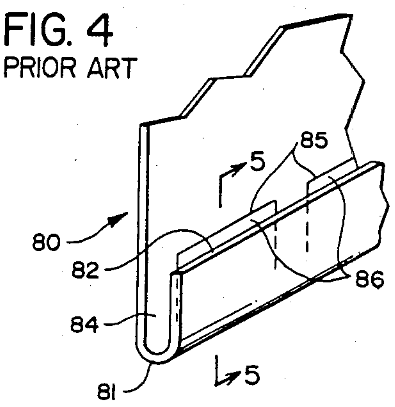
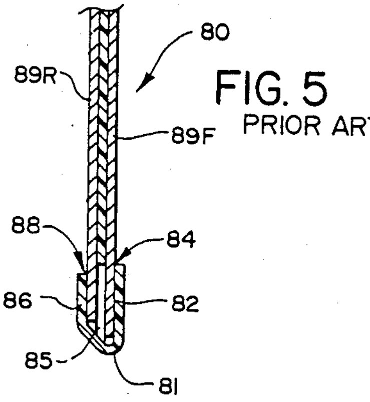
FIG. 5
PRIOR ART
FIG. 6
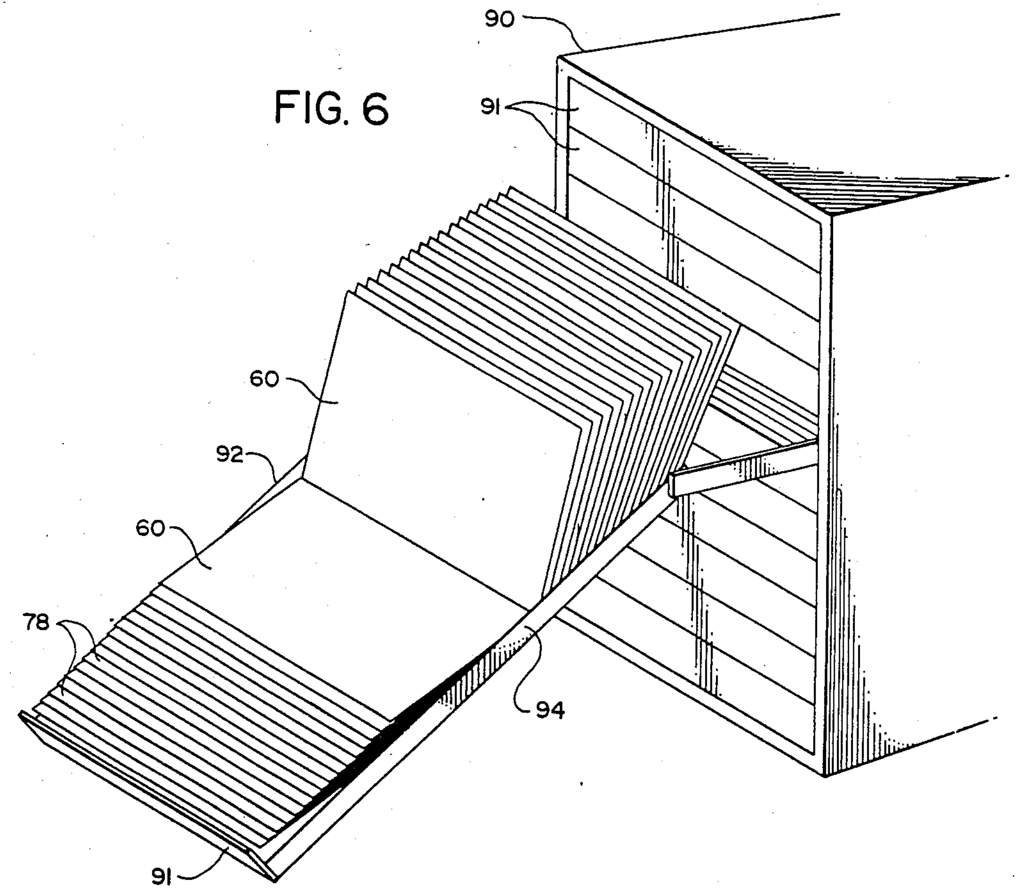

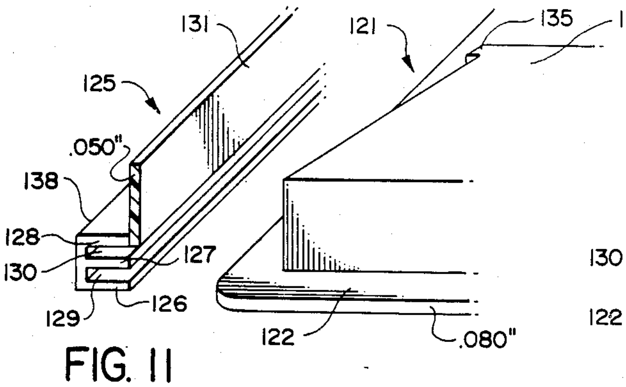
FIG. 11
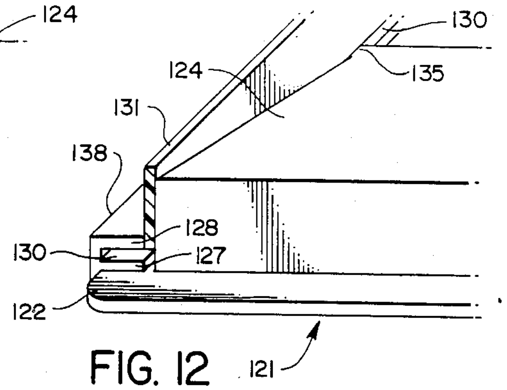
FIG. 12
FIG. 13
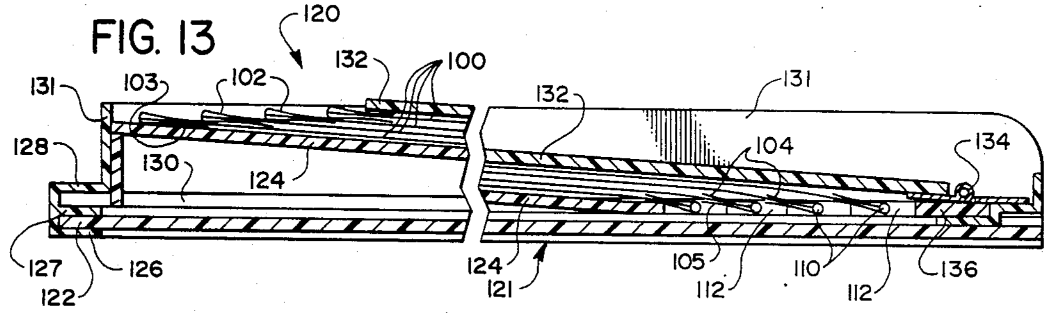
FIG. 14
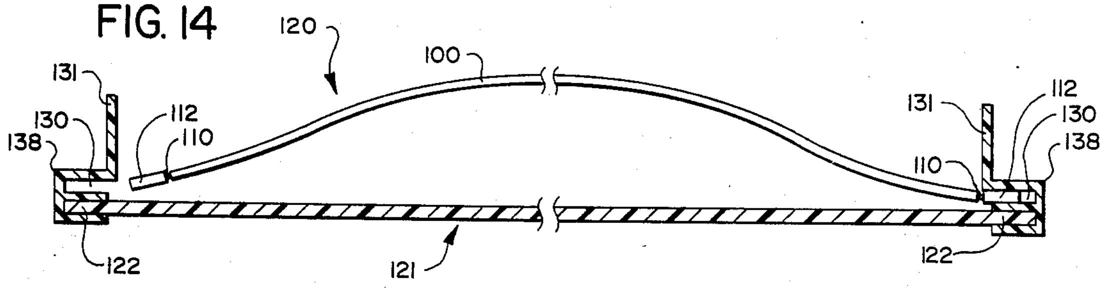

METHOD OF FABRICATING VISIBLE FILE POCKET SUPPORT PANEL

This is a division of application Ser. No. 461,538, filed Jan. 27, 1983 now U.S. Pat. No. 4,551,934.

RELATED APPLICATIONS

Alan F. Davies, U.S. patent application Ser. No. 461,538, filed Jan. 27, 1983, for "Visible File Pocket Support Panel And Method Of Fabricating Same", from which the present application has been divided, now U.S. Pat. No. 4,551,934, entitled "Visible File Pocket Support Panel."

Alan F. Davies, U.S. patent application Ser. No. 461,537, filed Jan. 27, 1983, for "Methods And Apparatus For Forming Visible File Pockets, And Pockets Produced Thereby And Therewith"; now entitled "Visible File Pockets.

Alan F. Davies, U.S. patent application Ser. No. 701,113, filed Feb. 13, 1985, for Methods For Forming Visible File Pockets", a Divisional Application based on Davies U.S. patent application Ser. No. 461,537, filed Jan. 27, 1983, for "methods And Apparatus For Forming Visible File Pockets, And Produced Thereby And Therewith".

Alan F. Davies, U.S. patent application Ser. No. 701,114, filed Feb. 13, 1985, for "Apparatus For Forming Visible File Pockets", now U.S. Pat. No. 4,584,051, a Division Application based on Davies U.S. patent Application Ser. No. 461,537, filed Jan. 27, 1983, for "Methods And Apparatus For Forming Visible File Pockets, And Pockets Produced Thereby And Therewith".

BACKGROUND OF THE INVENTION

1. Technical Field

The present invention relates generally to visible file pocket support panels and methods for fabrication thereof; and, more particularly, to improved visible file pocket support panels of the type commonly, but by no means exclusively, used in hospitals, clinics, medical offices and similar health care provider facilities wherein a plurality of individual patient records or cards are maintained and continuously updated, often on a daily or even shorter periodic basis, by the health care provider or by one or more staff members, and wherein those persons utilizing such files require that at least an identifying portion of each individual document file be immediately visible at a glance so that he or she can quickly turn to the particular document file of interest for purposes of reviewing and/or updating the same. Such files have long been known and used not only in health care facilities, but for numerous other purposes including inventory control and the like; and, many different types of visible document files are available.. This invention relates particularly to a lightweight, compact, portable visible file pocket support panel formed of only two essential basic components which can be readily assembled to form a support panel capable of holding any desired number of visible file pockets in a flat, overlapped, compact array with freedom for pivotal movement about individual hinge axes for each different file pocket and wherein the pocket tips—i.e., that portion of the file pocket turned back upon the main central pocket part intended to receive and confine one edge of the particular document(s) being displayed in the file pocket—adjacent the hinge axes lie in a common plane without being overlapped or stacked one upon the other, while the pocket tips remote from the hinge axes, although overlapped to an extent sufficient to preclude interference between adjacent file pockets, are readily and immediately visible at all times to permit display of identifying indicia for each of the file pockets carried on the support panel. The simple, compact configuration of the file pocket support panel permits of relative ease of insertion and/or removal of individual file pockets of the type more fully disclosed in the aforesaid related copending application, Ser. No. 461,537, filed Jan. 27, 1983; while, at the same time, effectively precluding accidental dislodgement, separation and/or loss of the particular file document(s) supported by each different file pocket.

2. Background Art

During the past several decades, many different types of record keeping systems have been devised and specifically tailored for the particular industry involved and/or the type(s) of file data being recorded and/or maintained. In some instances, the data card(s), hereinafter generically referred to as "document(s)", are intended for inventory management or control; and, in other instances. the documents commonly comprise patient records or the like maintained by such health care provisioners as hospitals, clinics, medical offices, and the like; to name but a few of the different industrial and/or business environments where such records are maintained. However, despite the specific nature and content of the business document itself and/or the particular industry/business environment involved, one problem that has commonly been encountered has involved record keeping systems wherein the particular business documents involved can be safely stored in such a manner that: i) each document is readily accessible so that authorized personnel having custody thereof and/or access thereto can review the same and/or make suitable entries thereon, all on a periodic and ofttime frequent basis—e.g., in a hospital it is often necessary to record a patient's vital signs on a shift, hourly, or even more frequent, basis; ii) each document may be conveniently inserted into, removed from, and/or replaced in its applicable file pocket; iii) each document is confined and protected such that it is not likely to be lost or misplaced; iv) all documents can be compactly stored in a minimum amount of storage space; v) equally sized documents can be mounted on the front and back faces of each file pocket; and vi), perhaps of most importance, identifying indicia for each different document file pocket is visibly exposed at all times so that a specific document and/or category of documents can be located at a glance and easily retrieved or exposed when, for example, an interested party wishes to review and/or update a particular document (such as a given patient record in the case of a health care provisioner). Thus, despite the wide differences in the types of documentary data maintained, in virtually all cases there have been many common requirements and/or desideratum in terms of document storage, access and/or retrieval.

Generally, such requirements and/or desideratum have been satisfied (to the extent possible) by providing individual file pockets formed from a wide range of materials and capable of storing and displaying one or more documents on each face of the file pocket; and, by providing each file pocket with hinge means disposed along one edge of the pocket whereby the pocket and whatever document(s) is (are) carried thereon can be removably and pivotally mounted in a generally flat document tray in staggered, partly overlapping, relation such that the bottom edges of all file pockets are fully exposed and available for the application of appropriate file identifying indicia, thereby enabling any particular file of interest to be located at a glance and all superimposed file pockets pivoted upwardly and backwardly about their hinged connections to the tray so as to fully expose the file pocket and stored document(s) of interest. Those skilled in the art will, of course, appreciate that the term "file pocket" as used herein is intended to mean a generally rectangular sheet-like support element normally having a hinge element formed along and/or attached to one horizontal edge and means for captively retaining one or more documents on at least one face, and generally both faces, of the rectangular sheet-like support element. The particular means for captively retaining documents have varied widely; but, one common practice has been to employ some means defining a pocket tip along one horizontal edge of the support element and on both the front and back faces thereof wherein the pocket tip cooperates with the support element to form front and/or back horizontally extending cavities adapted to receive and compressibly or yieldably retain the particular document(s) of interest.

One of the more popular conventional file pockets which has been extensively used for many years comprises a main support element generally formed from paper, paperboard, or a thin sheet of plastic such, for example, as celluloid. Commonly, an upper stiffening member, which also serves as a hinge, is stapled or otherwise affixed to one edge of the support element with the stiffening member projecting laterally beyond the side edges of the support element to permit the file pocket to be hingedly mounted in a tray. A second stiffening member, generally in the form of a U-shaped pocket tip-defining element commonly formed of celluloid or the like, is typically mounted in surrounding relation to the opposite or lower edge of the support element and retained in place by means of staples or the like. Commonly, the support element itself is provided with a plurality of generally parallel die cut diagonal slots disposed in a rectilinear pattern to permit the corners of file documents to be inserted through such slots so as to permit captive retention of at least one edge of the document on the support element. That is, a given document will commonly have one edge inserted into the pocket tip-defining means along one edge of the support element with the two corners of the document remote from that edge then being inserted into the appropriate diagonal die cut slots formed in the support element. A plurality of such file pockets have conventionally been hingedly mounted in suitable document tray.

While the foregoing approach has provided a very convenient and popular way to maintain file documents, certain drawbacks have nonetheless been encountered. Thus, a significant problem resides in the conventional use of paper or paperboard as a principal construction material for the support element itself. In such cases, repeated use of the file pocket causes frequent need to replace such pockets due to failure of the support element, particularly at or near the weakened hinge line. The use of staples and similar separate fasteners to secure the components together into a file pocket assembly invariably necessitates die cutting the documents themselves to provide a slot therein so that the edges of documents can bridge the locations of the staples. The use of an array of diagonal slots to receive corners of documents produces numerous weakened areas in the main body of the support element which are subject to tearing and fatigue damage; and, in the case of smaller documents precludes support of two identically sized documents on both faces thereof since the first document disposed within a given series of diagonal slots obstructs the same and prevents use of the same slots for retention of documents on the opposite face. Nevertheless, despite the foregoing disadvantages, such composite paperboard/plastic file pockets have, prior to the advent of the present invention, continued to be the most commonly accepted form of visible document storage/retrieval system used in industry and/or business today notwithstanding numerous efforts that have been made to modify that approach.

One such attempt to provide an improved file pocket has involved the use of a sheet-like plastic support element which has its lower edge turned upwardly upon itself to form a pocket tip on the front face of the support element; and, wherein the main support element is provided with two or more inverted U-shaped slits in the region thereof underlying the upturned pocket tip so as to define tabs therein which can be projected out of the plane of the support element in a direction opposite to the upturned pocket tip so as to define a second discontinuous pocket tip on the opposite or rear face of the support element. While this approach generally avoids the disadvantages inherent with the former type of file pocket resulting from the use of staples and similar fastening elements, many disadvantages are still presented. Thus, the upturned pocket tip formed on one side of the support element and the discontinuous pocket tip formed on the opposite side of the support element are not symmetrical and still tend to preclude receipt and storage of identically sized documents on both sides of the support element. Dependent upon the position and configuration of the slits and folds employed to form the discontinuous pocket tip, individual file documents often still require die cuts in the regions of pocket tip discontinuity. Moreover, this type of file pocket has not satisfactorily resolved the need for a particular pocket tip configuration which compressibly and yieldably retains documents captive therein.

Accordingly, the need continues to exist: i) for an improved file pocket construction which is capable of accommodating identically sized documents on each face of the file pocket and wherein one or more of such documents are firmly and positively retained, compressibly and yieldably, in captive relationship within the pocket tips so as to prevent accidental dislodgement of documents and consequent loss and/or damage thereto; and ii), for a file pocket support panel capable of hingedly storing a plurality of such file pockets, yet which is characterized by its portability. The present invention is particularly concerned with the latter need; and, those interested in ascertaining details related to an invention concerned with the former need are referred to the aforesaid related copending Application, Ser. No. 461,537, filed Jan. 27, 1983.

SUMMARY OF THE INVENTION

A simple, lightweight, economical visible file pocket support panel or tray and method for forming the same are disclosed wherein the support panel can be readily fabricated from two basic lightweight elements formed, for example, of plastic or the like—viz.: i) a rectangular panel bottom defining a laterally extending peripheral flange, and including a file pocket support ramp having a depth approximately equal to the vertical height of the file pockets to be hingedly mounted thereon and extending rearwardly and downwardly from the front edge of the panel bottom towards, but terminating short of, the rear edge of the panel bottom, and wherein the panel bottom extends rearwardly from the rear edge of the support ramp by a distance slightly greater than "n" (where "n" equals any whole integer equal to the number of file pockets to be supported) times the vertical height of the pocket tip formed adjacent the hinge defining edge of each file pocket; and ii), a peripheral edge defining channel member having an E-shaped cross-sectional configuration and an upstanding vertical flange. Thus, the configuration is such that the laterally extending peripheral flange on the rectangular panel bottom is inserted into, and bonded in, the first lowermost longitudinal slot defined by the lower and intermediate legs of the E-shaped edge defining channel member with the support ramp covering the upper second longitudinal slot defined by the intermediate and upper legs of the E-shaped edge defining channel member coextensively with the front and side edges of the support ramp while leaving the upper second longitudinal slot open and exposed along the sides of the file support panel extending rearwardly from the rear edge of the support ramp and thus providing a groove for captively but releasably retaining the laterally projecting hinge elements associated with "n" file pockets. The panel of the present invention may include any suitable means for preventing rearward movement of the laterally projecting hinge elements on the "n" file pockets within the upper second slot while the ramp effectively precludes forward movement thereof. The panel may, if desired, be provided with a relatively rigid sheet-like top stop or plate hingedly connected to the rear edge of the panel bottom for protecting documents and file pockets mounted thereon.

As a consequence of the foregoing construction, "n" file pockets are hingedly supported in flat partially overlapped relation within the panel in such a manner that the pocket tips on the edges of the file pockets proximate to their hinge axes lie in a common horizontal plane coincident with the plane of the second or upper slot in the E-shaped edge defining channel member without being stacked or overlapped, while the upper ones of the pocket tips on the "n" file pockets which are remote from the "n" hinge axes are partially overlapped and raised by the support ramp to a horizontal plane generally at, or just below, the upper edge of the vertical flange on the E-shaped edge defining channel member so as to continuously expose the upper ones of the "n" remote pocket tips and the file identifying indicia contained therein or thereon while permitting any given one of the "n" file pockets to be immediately exposed by the simple expedient of pivoting all superimposed ones of the "n" overlapped file pockets upwardly and rearwardly about their individual hinge axes. Moreover, the vertical flange on the E-shaped edge defining channel member serves to confine documents mounted within the "n" file pockets from lateral movement with respect to the file pockets per se, while the outer contour of the E-shaped portion of the edge defining channel member forms a laterally projecting flange on each side of the file pocket support panel, thereby permitting mounting of the file pocket support panel in longitudinally extending opposed tracks formed in a conventional file cabinet or the like. The configuration of the E-shaped edge defining channel member is such that a pair of vertical cuts can be formed in and extending through the channel member while leaving the vertical flange intact for permitting a single continuous channel member to be wrapped about at least the two side and front edges of the panel bottom with the vertical cuts coincident with the front corners of the panel, thereby simplifying fabrication of the file pocket support panel of the present invention.

More specifically, it is a general aim of the present invention to provide a simple, compact, inexpensive, lightweight file pocket support panel capable of hingedly supporting "n" file pockets and maintaining such file pockets in flat, partially overlapped form with one edge of each of the "n" file pockets being exposed at all times for continuous display of file identifying indicia and wherein the hinge axes and proximate pocket tips for the "n" file pockets lie in a common plane without being overlapped so as to minimize the volumn of space required to store documents.

A further objective of the present invention is the provision of a simple file pocket support panel of the foregoing type which permits of ease of manufacture and which can be quickly fabricated to meet any specific requirements in terms of number of file pockets to be stored and the size thereof by the simple expedient of wrapping a continuous edge defining channel member having two inwardly facing parallel longitudinal slots about an appropriately sized panel bottom having a support ramp integrally formed thereon with the lower slot accommodating a peripheral flange on the panel bottom and that portion of the upper slot located rearwardly of the support ramp defining a hinge element mounting area for the "n" file pockets.

BRIEF DESCRIPTION OF THE DRAWINGS

These and other objects and advantages of the present invention will become more readily apparent upon reading the following detailed description and upon reference to the attached drawings, in which:

FIG. 4 is a fragmentary perspective view of the lower edge of a somewhat modified conventional file pocket of the type here formed from plastic sheet material;

FIG. 5 is a sectional view taken substantially along the line 5—5 in FIG. 4 and here illustrating the conventional plastic file pocket supporting a pair of documents on the opposite faces thereof;

FIG. 6 is a perspective view of an exemplary file cabinet for supporting a series of trays or panels, each of which is adapted to hingedly receive a plurality of conventional document file pockets;

FIG. 11 is a fragmentary, exploded, perspective view illustrating two of the basic components from which the portable tray or panel shown in FIGS. 9 and 10 is constructed;

FIG. 12 is a fragmentary perspective view, partly in section, here illustrating the two basic components shown in FIG. 11 in assembled form;

FIG. 13 is a sectional view taken substantially along the line 13—13 in FIG. 9, and particularly depicting the overlapping relation of a plurality of file pockets mounted in the portable tray or panel; and, FIG. 14 is a sectional view taken substantially along the line 14—14 in FIG. 10, and here illustrating the manner in which a pocket is removed from and/or inserted into the portable tray or panel of the present invention.

Figure 1:
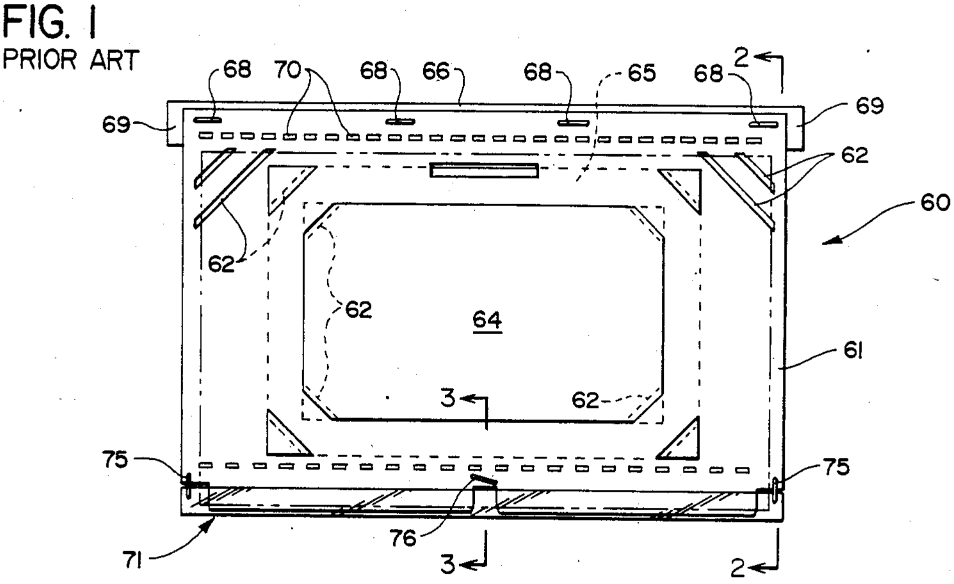
FIG. 1 PRIOR ART
FIG. 1 is a plan view of a conventional document file pocket of the type commonly fabricated from paperboard or similar heavy paper stock, with the central paperboard web having a hanger-like support stapled along its upper edge and a plastic pocket tip-defining component stapled along its lower edge with the central paperboard web portion of the file pocket including a plurality of diagonal die cut slots positioned to support the corners of appropriately sized documents.

While the in;ention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Environment Of The Invention

Figure 2:
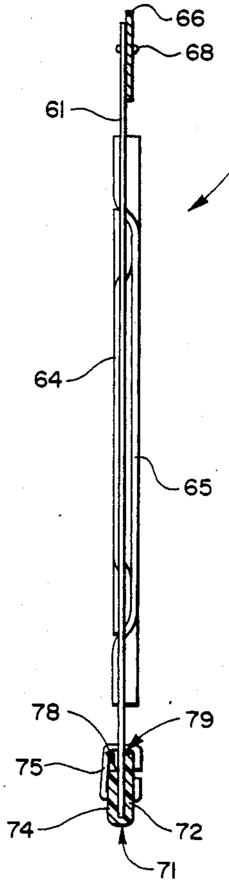
FIG. 2 PRIOR ART
FIG. 2 is a sectional view taken substantially along the line 2—2 in FIG. 1, but here illustrating the various components in somewhat exaggerated form for purposes of clarity.
Figure 3:
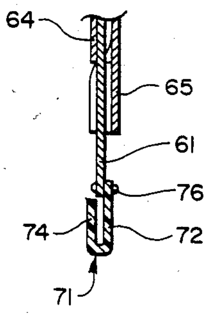
FIG. 3 PRIOR ART
FIG. 3 is a sectional view taken substantially along the line 3—3 in FIG. 1, and depicting particularly the means for securing the plastic pocket tip-defining component to the central paperboard support web in the middle of the file pocket.

Turning first to FIGS. 1 through 3, conjointly, there has been illustrated a conventional prior art file pocket, generally indicated at 60, of the type which, prior to the advent of the present invention, had achieved perhaps the most widespread acceptance by businesses and/or industries requiring visible document filing systems. Thus, as here shown, the conventional file pocket 60 includes a central sheet-like support element 61 which is, and has for many years been, commonly made of heavy paper stock in rectangular form. The support element 61 normally includes an array of generally parallel die cut slots 62 which are oriented in a rectilinear pattern along diagonals of the support element. As here shown, a first document 64 is mounted on the front face of the structural element 61 in such a manner that the four corners of the document 64 project through four respective diagonal slots 62 for retention of the document 64 on the structural element 61. Thus, those four corners of document 64 project through the slots 62 in the structural element 61 from the front face thereof and lie generally parallel to the rear face of the structural element 61, as best indicated by reference to FIGS. 2 and 3. The same file pocket 60 is also shown retaining a second, somewhat larger, document 65 disposed on the rear face thereof. As with document 64, document 65 is likewise retained in position by having its four corners projected through a different set of four slots 62 from the rear face of element 61 so that the four corners of document 65 lie generally parallel to the front face of element 61. As can be readily appreciated, the use of a given pair of diagonal slots 62 to mount a document on one face of the file pocket 60 precludes the use of those same slots to mount a second document having the same dimensions on the opposite face of the file pocket 60 since, once a first document is secured on one face of the structural element 61, those particular slots will be blocked.

A separate strip 66 of paper, paperboard or the like is secured to the upper edge of the conventional file pocket 60 by a series of staples 68, four of which are shown in FIG. 1 for this purpose. The paper strip 66 is dimensioned to be somewhat longer than the length of the file pocket 60 to yield opposing, somewhat overhanging, portions 69 at either edge thereof. Strip 66 serves to rigidify the upper edge of the file pocket 60 while the overhanging portions 69 provide means for mounting the file pocket 60 within a tray support, as may be best visualized by reference to FIG. 6. A series of linearly disposed die cut slots 70 are formed near the upper edge of the support element 61, which series of slots defines a hinge line between the region of the support element 61 which receives the documents and the stiffened edge of the file pocket.

The lower edge of the structural element 61 has commonly been provided with a pocket tip-defining member, generally indicated at 71. The pocket tip-defining member 71 has typically been formed of a generally U-shaped piece of plastic, as best viewed in FIGS. 2 and 3, where one leg of the "U", designated 72, is somewhat longer than the other leg, designated 74. The pocket tip-defining member 71 is normally secured to the structural element 61 by means of staples 75 near both corners and by a central staple 76. Usually, the central staple 76 engages only the longer leg 72, as best viewed in FIG. 3. Accordingly, a first or front pocket tip, generally indicated at 78, is formed across the front face of the file pocket 60 between the lower edge portion of element 61 and the inside face of the leg 74; while a rear pocket tip, generally indicated at 79, is provided on the rear face of the file pocket 60 between the element 61 and the inside face of leg 72.

The two pocket tips 78, 79 serve as places to insert the lower edges of a pair of documents where the same are larger than might be accommodated by the array of slots 62, or as otherwise might be desired to display key information. When such an option to use the pocket tips 78, 79 is exercised, the location of the center staple 76 provides an unobstructed front pocket tip 78 but, because the staple must pass through and into engagement with the leg 72, a central obstruction of the rear pocket tip 79 is encountered. Accordingly, use of the rear pocket tip 79 may be made only if the document to be stored therein is die cut with a slot bridging the region of the center staple 76; a rather inconvenient requirement and one increasing the cost of the record forms. Moreover, in those instances where the documents to be mounted on the file pocket 60 have the same width as the support element 61, the presence of the end staples 75 require further die cuts in the documents and, of course, the upper corners of the documents must be similarly die cut in order to be accommodated within the diagonal slots 62.

Although file pockets of the type shown at 60 in FIGS. 1 through 3 have seen considerable commercial use and have been widely recognized as a convenient means for visibly displaying documents, there are certain drawbacks to the construction thereof. Usually, the support element 61 is formed of paper, as is the stiffening strip 66. After extended periods of use, the paper members begin to lose their integrity, requiring replacement of the entire file pocket. Obviously, records borne on the file pocket 60 must be transferred to a new one at that time. Likewise, because of the paper fabrication, there is a tendency for failure of the hinge defined by the lineal array of slots 70. The formation of an array of diagonal die cut slots in the paper body of the support element 61 tends to create weakened areas subject to tearing and/or fatigue. The need to staple the lower pocket tip-defining member 71 causes an obstruction intermediate the rear pocket tip 79 which, in turn, requires specially constructed documents if that pocket tip is to be used. Moreover, there is a tendency for the staples to loosen and/or tear the sheet materials through which they extend, thus resulting in the pocket tip-defining member 71 separating from the element 61. While some of the aforementioned problems might be eliminated by selection of alternate materials, other limitations are inherent in the design and simply cannot be eliminated without a wholesale reconstruction of the file pocket 60.

Recognizing many of the foregoing disadvantages inherent with the conventional file pockets 60 of the type shown in FIGS. 1–3, a somewhat modified file pocket, a fragmentary portion of which has been generally indicated at 80 in FIGS. 4 and 5, has been developed. In this type of construction, the file pocket is generally formed of plastic material in sheet-like form and is folded and heat set along its lower edge 81 to provide an upturned lip 82 defining a continuous, longitudinally extending, pocket tip 84 coextensive with the bottom edge 81 of the file pocket 80 and on the front face thereof. The plastic sheet is provided with one or more inverted U-shaped slits 85 extending therethrough, generally in the region underlying the upturned lip 82, thereby permitting the tabs 86 defined by the slits 85 to be projected rearwardly out of the plane of the plastic sheet so as to form a discontinuous pocket-tip 88 on the rear face of the file pocket 80, as best illustrated in FIG. 5. Once again, however, the configuration of the front and back pocket tips 84, 88 is generally such that documents 89F and 89R respectively mounted in the front and rear pocket tips are either of different sizes or must be specially shaped in the region of the discontinuity bridging adjacent tabs 86. Moreover, this type of known construction fails to provide pocket tips which are capable of compressibly and yieldably retaining documents captive therein.

Referring next to FIG. 6, there has been illustrated a typical storage system for permitting storage of visible file pockets of, for example, the type indicated at 60 in FIGS. 1–3. As here shown, the exemplary conventional storage system includes a file cabinet 90 having a plurality of identical storage trays 91, each of which is provided with a pair of channel-like tracks 92, 94 for receiving the projecting ends 69 (FIG. 1) of the file pocket stiffening element 66. Thus, the arrangement is such that any given tray 91 can be withdrawn from the file cabinet 90 to display a plurality of file pockets 60 hingedly mounted therein in partially overlapped relation, with the lower pocket tip 78 on the front faces of all file pockets 60 being visibly displayed so that the user can immediately locate a particular file pocket of interest by reference to identifying indicia contained in the region of the pocket tip 78.

Figure 7:
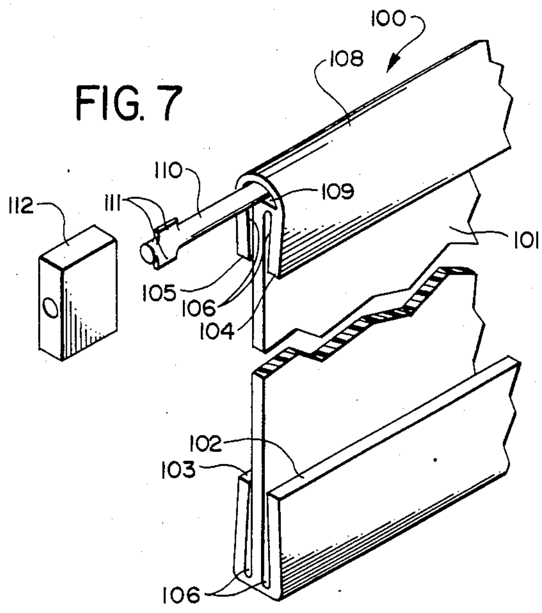
FIG. 7 is a partially exploded, fragmentary, perspective view of an exemplary visible document support or file pocket made in accordance with one form of the invention disclosed more fully in the aforesaid related copending Application, Ser. No. 461,537, filed Jan, 27, 1983.

File Pocket, Support Panel, And Method For Fabricating The Same In Accordance With The Invention Referring now to FIG. 7, there has been illustrated, in fragmentary, somewhat diagrammatic, form, one type of exemplary file pocket, generally indicated at 100, made in accordance with the invention more fully disclosed and claimed in the aforesaid related copending U.S. patent application, Ser. No. b 461,537, filed Jan. 27, 1983. As here shown, the exemplary file pocket 100 includes a laminar central web 101 formed from two sheets of polymeric material heat sealed together and terminating at its lower and upper horizontal edges (as viewed in the drawing) in lower front and back upturned pocket tips 102, 103 and upper front and back downturned pocket tips 104, 105, all of which define with the central web 101 horizontally extending continuous cavities 106 adapted to receive the lower and upper horizontal edges of one or more documents (not shown) for captively retaining such documents therein and in a position where suitable entries may be made on the exposed face of each document and/or wherein a given document may be removed, reinserted or replaced with a different document. As will be apparent upon inspection of FIG. 7, the exemplary file pocket 100 is characterized by front-to-back symmetry—that is, the lower front and back pocket tips 102, 103 are identical, as are the upper front and back pocket tips 104, 105; and, all four pocket tips define continuous cavities 106, thereby readily permitting of display of two identically sized documents on the front and back faces of the file pocket.

For the purpose of permitting the file pocket 100 to be hingedly mounted in a tray or support panel made in accordance with the present invention, the upper edge 108 of the file pocket 100 as viewed in the drawings is provided with a transversely extending bore 109 through which extends a suitable flexible hinge pin 110 which projects from both vertical edges of the file pocket--while only the left edge of the file pocket 100 and projecting portion of hinge pin 110 are visible in FIG. 7, it will be understood that the hinge pin 110 similarly projects from the right edge of the file pocket. After insertion of the hinge pin 110 through bore 109, both projecting ends of the hinge pin are preferably formed with diametrically extending flats 111. Hinge elements 112 formed of, for example, suitable sheet plastic material or the like in rectangular chip form, are mounted on the projecting ends of hinge pin 110 with the hinge pin flats 111 being forced into the chip-like hinge elements 112, thus nonrotatably mounting the hinge elements 112 on the opposite projecting ends of the hinge pin 110.

Figure 8:
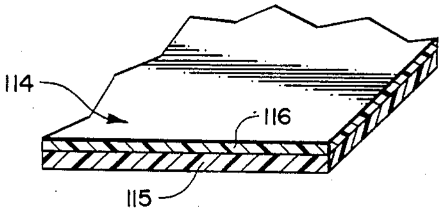
FIG. 8 is a fragmentary, perspective view of a sheet of polymeric web material of a type suitable for making the document file pockets depicted in FIG. 7.

In keeping with the invention, the file pocket 100 comprises a double ply of polymeric material wherein the two plies are heat sealed together in face-to-face relation to form a unitary laminar central web portion 101 for the file pocket. A portion of a suitable coated polymeric sheet material has been illustrated in FIG. 8; and, is generally designated by the reference numeral 114. It has been found that a particularly suitable polymeric material 114 for the practice of the present invention comprises a sheet 115 of polyester, such as that sold under the trademark "MYLAR", which is on the order of three mils in thickness and which has formed on one surface thereof a film 116 of heat-bondable polyethylene generally on the order of two mils in thickness. This type of conventional polymeric material is well known to persons skilled in the art and has commonly been used to laminate, for example, photographs, licenses and similar documents which are sandwiched between two sheets of such coated material having the heat-bondable polyethylene surfaces 116 in face-to-face relation and, thereafter, applying a heat-seal effective pressure and temperature to form the laminated sandwich. The facing polyester surfaces 116 respond to the laminating treatment to form a unitary, integral, composite laminated structure containing the document to be laminated. As more fully described in the aforesaid related copending application, Ser. No. 461,537, filed Jan. 27, 1983, it has been found possible to employ a somewhat similar laminating technique to form the central web 101 for the file pocket 100 shown in FIG. 7—i.e., two sheets of polyethylene coated polymeric material are placed in face-to-face relation and heat sealed together over the major central portion thereof to produce the laminar central web; but, wherein provision is made for inhibiting heat sealing of the two plies of coated polymeric material along two opposed longitudinal edges thereof, thereby enabling those unlaminated, unsealed longitudinal edges to be subsequently folded over during further processing steps to form the upper and lower pocket tips 102, 103, 104, 105 and hinge pin receiving bore 109. The details of such subsequent processing steps are described more fully in the aforesaid related copending application, Ser. No. 461,537, filed Jan. 27, 1983.

Figure 9:
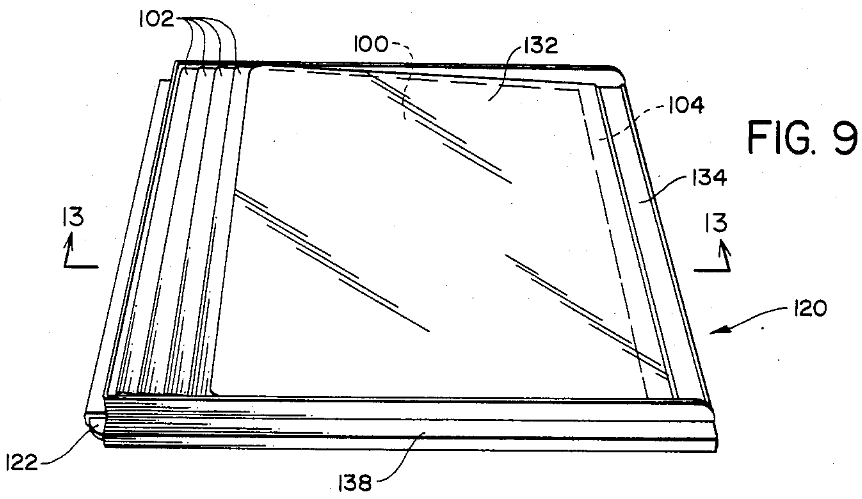
FIG. 9 is a perspective view of a portable tray or panel embodying features of the present invention and which is suitable for supporting a plurality of file pockets of the type shown in FIG. 7.
Figure 10:
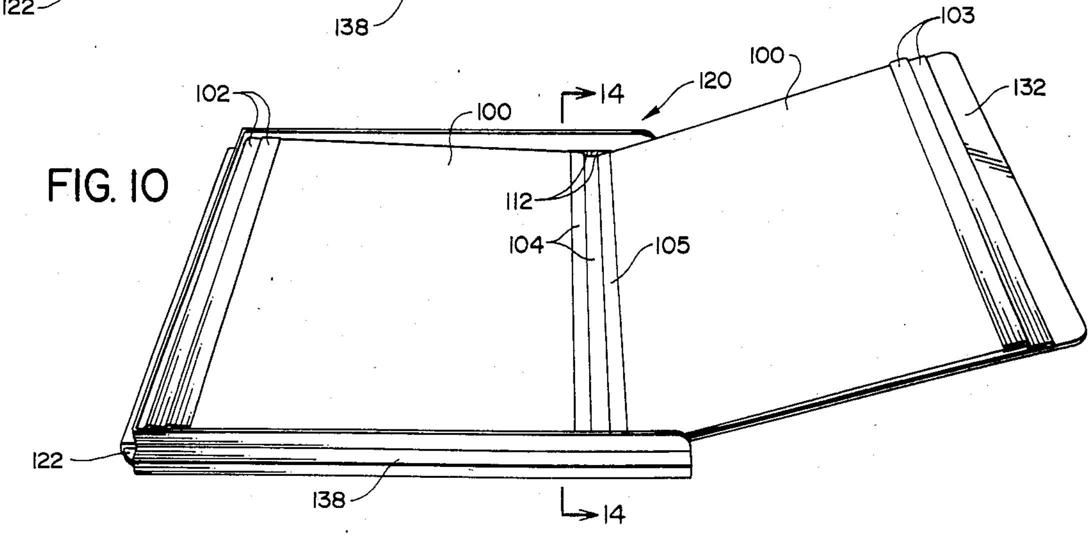
FIG. 10 is a perspective view similar to that shown in FIG. 9, but here illustrating the panel top stop and several of the file pockets pivoted to the open position about their hinged connections to the panel so as to expose a document supported on the reverse face of one of the pivoted file pockets and a document supported on the front face of one of the underlying file pockets.

In accordance with one of the important aspects of the present invention, a lightweight, portable, visible file pocket support panel, generally indicated at 120 in FIGS. 9 and 10, is provided for hingedly supporting "n" (where "n" is any desired whole integer) file pockets 100 in a compact, flat, overlapped array wherein the lower front pocket tips 102 of all of such "n" file pockets are visible; and, therefore, permitting the display of suitable identifying indicia for the documents stored in each different file pocket. To this end, and as best illustrated by reference to FIGS. 11 through 14 conjointly, the file pocket support panel 120 of the present invention includes a base member, generally indicated at 121, having a laterally extending peripheral flange 122 and a central, rearwardly descending, inclined ramp 124. A generally E-shaped edge defining channel member 125 is provided which surrounds at least the front and two side edges of the base member 121, such channel member 125 having horziontally extending lower, intermediate and upper legs 126, 127, 128 defining longitudinally extending lower and upper slots 129, 130, and a vertically extending flange 131 formed at the free end of the channel member's upper horizontal leg 128. In order to protect the documents, the support panel 120 of the present invention may optionally be provided with a cover or top plate 132 preferably formed of clear sheet plastic material and hingedly connected to the rear edge of the base member 121 by a suitable hinge 134 and conventional fastening means such as rivets or the like (not shown).

To assemble the support panel 120 in accordance with the present invention, the laterally projecting flange 122 on base member 121 is positioned within the lower slot 129 of the edge defining channel member 125 and bonded in place, while laterally projecting tabs disposed at the rear end of the rearwardly descending inclined ramp 124 (one of which is shown at 135 in FIG. 11) are bonded in place within the upper slot 130 in the channel member 125, as best shown in FIGS. 11 and 12. The edge defining channel member 125 may be applied to the two side and front edges (and, if desired, the back edge) of the base member 121 in three (or four) separate pieces or, if desired, as one continuous piece. In the latter case, it is merely necessary to cut through the horizontal legs 126, 127, 128 of the edge defining channel member (while leaving the vertical flange 131 intact) at those points corresponding to the corners of the base member 121 about which the channel member is to be wrapped, thereby enabling a single continuous length of channel member 125 to be wrapped about the base member with the vertical flange 131 being bent through angles of 90° at each corner of the device, an arrangement most clearly visible in FIG. 10.

When assembled in either of the foregoing manners, and as best depicted in FIG. 12, it will be noted that the rearwardly descending ramp 124 serves to occupy and/or overlie the upper slot 130 in the edge defining member 125 at all areas coextensive with the ramp 124; while the slot 130 is open and exposed rearwardly of the ramp 124. Thus, the arrangement is such that when one wishes to insert a file pocket 100 (FIG. 7) into the file pocket support panel 120, it is merely necessary to first insert one of the chip-like hinge elements 112 into the upper slot 130 along one side of the panel while flexing the file pocket 100 and hinge pin in the manner best shown in FIG. 14. Thereafter, the opposite hinge element 112 is inserted into the upper slot 130 on the other side of the panel 120. In this construction, the flat rectangular shape of the hinge elements 112 and their non-rotatable connection with the hinge pin 110 defines a stationary hinge axis permitting each file pocket 100 to be rotated about its hinge pin 110 between the positions shown in FIG. 10. Suitable stops (one such stop being illustrated at 136 in FIG. 13) are positioned in the rear ends of each exposed slot 130 for preventing rearward movement of the hinge elements 112 within the slots 130; while forward movement of the hinge elements is precluded by the tabs 135 on the ramp 134. Thus, the file pockets 100 are fixedly positioned in the support panel 120 with freedom for pivotal movement, while each file pocket 100 can be easily inserted into or removed from the panel 120 by the simple expedient of flexing the hinge pin 110 and moving the hinge elements 112 laterally relative to the confining slots 130—i.e., either into or out of the slots as shown in FIG. 14.

Those skilled in the art will readily appreciate that the particular materials and dimensions employed in the practice of the present invention may vary widely without departing from the spirit and scope of the invention as expressed in the appended claims. However, excellent results have been attained where the channel member 125 is formed of polyvinyl chloride (PVC)—for example, by extrusion techniques—wherein the thicknesses of flange 131 and legs 126, 127 and 128 are approximately 50 mils and wherein the slots 129, 130 are approximately 80 mils in height. Similarly, excellent results have been attained wherein the base member 121 is formed of acrylonitrile-butadiene-styrene (ABS) having a thickness on the order of 80 mils. The two major components of the invention—viz., the base member 121 and edge defining channel member 125—may be bonded together in any suitable manner—for example, with the use of a solvent or other adhesive material. Excellent results have been obtained where using a solvent such as "WELD-ON 4" manufactured by Industrial Polychemical Services of Gardenia, Calif.

Similarly, the overall dimensions of the file pocket support panel 120 may be varied widely dependent upon the maximum size of the documents to be filed in flat, unfolded form and the number of file pockets 100 to be supported on each support panel 120. For example, assuming that the file pocket support panel 120 is intended to support four file pockets 100 each capable of receiving and displaying a document 11 inches wide and 8½ inches high on both the front and rear faces thereof, then it has been found most practical to form file pockets 100 which are 11 inches in width and approximately 8⅝ inches in height; and, wherein the front and back pocket tips 102, 103 are approximately 15/32 inch deep, front and back pocket tips 104, 105 are approximately ⅜ of an inch deep, and the overall depth from the free edge of the pocket tips 104, 105 to the upper edge 108 of the file pocket—i.e., that portion of the file pocket 100 including the upper pocket tips 104, 105 and the edge 108 defining the longitudinal bore 109—are on the order of 7/16 inch. Similarly, the vertical height of the chip-like hinge elements 112 is preferably made the same as the vertical distance between the free edges of pocket tips 104, 105 and the upper edge 108 of the pocket—viz., 7/16 inch.

With such file pocket dimensions, the file pocket support panel 120 would desirably include a base member 121 having a width of about 11⅞ inches and a depth of about 11½ inches, on which is formed a centrally located ramp 124 slightly wider than the width of the file pockets—for example, approximately 11 1/16 inches—and a front-to-rear depth of 8½ inches. Such a dimensional arrangement results in a laterally projecting flange 122 of about ⅜ inch at each side and forward of the ramp 124 and a base 121 which extends rearwardly from the rear edge of ramp 124 a distance of approximately 2⅝ inches, thus providing adequate room for mounting the four sets of file pocket hinge elements 112 and a top plate hinge member 134. The channel member 125 would, in such an arrangement, preferably be on the order of 33 9/16 inches in length defining two side edges each having a length of about 11¼ inches and a front edge having a length of 11 1/16 inch. The stops 136.(FIG. 13) would here be positioned in the upper slots 130 approximately 1⅝ inches to the rear of the rear edge of the inclined ramp 124, thereby premitting accommodation of four hinge elements 112 in each of the side slots 130 with the laterally projecting tabs 135 formed on the ramp 124 preventing forward movement of the hinge elements 112 relative to the slots 130 while the stops 136 prevent rearward movement thereof. Nevertheless, as previously indicated, the hinge elements may be moved laterally into and/or out of the slots 130 as indicated in FIG. 14.

Thus, and as best illustrated in FIG. 13, the arrangement is such that four file pockets 100 may be conveniently mounted in the file pocket support panel 120 with freedom for selective hinged movement about their individual fixed hinge pins 110 either singly or in groups. Because the hinge elements 112 are dimensioned to have the same vertical height (as viewed in FIG. 7) as the upper pocket tips 104, 105 and edge 108, there is no overlapping of the file pockets 100 in the region of the upper pocket tips 104, 105. Since the lower pocket tips 102, 103 are approximately 15/32 inch in height, they do overlap by approximately 1/32 inch, thus leaving about 7/16 inch of the front lower pocket tip 102 exposed. Consequently, identifying indicia printed along the lower 7/16 inch of each document positioned within the front face of each file pocket 100 is readily visible to the user. The use of the inclined ramp 124 serves to present the lower edges of all four file pockets at a common elevation where each can be easily manipulated by the user's fingers. And, the upstanding vertical flange 31 on the edge defining channel member 125 serves to preclude lateral movement of documents mounted on both faces of all file pockets 100 at all positions that the file pockets assume, whether flat as shown in FIG. 9 or pivoted as shown in FIG. 10.

It will be obvious from the foregoing description that where it is desired to support more or less than four file pockets 100 in the exemplary file pocket support panel 120, it is merely necessary to increase or decrease the depths of the base member 121 and the side portions of the edge defining channel member 125 in increments of 7/16 inch—for example, if the panel is intended to receive five file pockets 100, the length of the side portions of the edge defining channel member 125 would be increased from the exemplary length of 11¼ inches to 11 11/16 inches while the depth of the base member 121 would be increased from about 11½ inches to about 11 15/16 inches. The fixed stops 136 (FIG. 13) would similarly be moved rearwardly so that the exposed portion of the upper slots 130 would have a length of 2 3/16 inch instead of 1⅝ inch, thereby accommodating five 7/16 inch hinge elements 112 instead of only four.

Referring to FIGS. 10 and 14 conjointly, it will be observed that the foregoing exemplary construction of the edge defining channel member 125 provides a rearwardly extending laterally projecting flange 138 along each opposed side edge of the panel 120 which readily permits the panel to be slidably mounted in a suitable file cabinet having complementally shaped opposed tracks (not shown). Moreover, the compact nature of the construction is such that users can conveniently carry file pockets of interest to specific points remote from a central storage area. For example, when the file pocket support panel 120 of the present invention is used to support individual patient records in a medical health care provisioner facility, each nurse having responsibility for a given group of patients can conveniently remove a single file pocket support panel 120 containing all of the patient records for those patients in his or her care from the main nurse's station and take such records on his or her rounds for entry of data of interest such, for example, as patient temperature, blood pressure, etc. Similarly, an inventory control manager who wishes to verify the accuracy of specific inventory records and/or make entries with respect thereto can readily carry an appropriate file pocket support panel 120 from the manager's office to the point where the records are to be checked and/or updated.

Those skilled in the art will, of course, appreciate that the foregoing dimensional relationships have been set forth by way of example and are not intended to be limiting. The particular file pocket support panel 120 may, of course, vary considerably in its dimensions dependent only upon the size of the largest documents to be filed in flat, unfolded fashion and the number of file pockets that the user wishes to support on each file pocket support panel.

What is claimed is:

1. The method of forming a file pocket support panel for hingedly mounting "n" (where "n" is any whole integer) visible file pockets each having a generally rectangular central web, an upturned lower front pocket tip formed along the front of the web adjacent the lower transverse edge thereof, and laterally projecting hinge elements mounted on the web adjacent the upper transverse edge thereof, and for supporting the "n" visible file pockets in a generally flat, overlapped array with freedom for pivotal movement about their individual hinge axes and wherein the lower front pocket tips on all of the "n" file pockets are visible when all of the "n" file pockets are flush with the supporting panel, comprising the steps of:

(a) forming a central rectangular base member having a ramp surface descending from the front edge thereof towards, but terminating short of, the rear edge thereof and including a laterally extending flange surrounding at least the front and side edges of the central base member;

(b) forming an edge channel member having an E-shaped cross-sectional configuration including lower, intermediate and upper legs each terminating in a free inner end and defining lower and upper longitudinally extending slots, and further having a vertical flange extending upwardly from the free inner end of the upper leg;

(c) positioning the laterally extending flange on the base member within the lower longitudinally extending slot in the E-shaped channel member with the E-shaped base member surrounding at least the side and front edges of the central base member and projecting rearwardly from the ramp surface on both sides thereof, and with the ramp surface overlying and blocking the upper longitudinal slot along both the side and front edges of the ramp surface with the upper longitudinal slot being exposed and open along both sides of the support panel rearward of the ramp surface; and, (d) positioning a fixed stop in the exposed open upper longitudinal slot formed in the E-shaped channel member on each side of the support panel and at a sufficient distance rearward of the ramp surface so as to accommodate the laterally projecting hinge elements on "n" file pockets in each of the exposed open portions of the upper longitudinal slot for enabling individual ones and/or groups of the "n" file pockets to be pivoted about their individual hinge axes for exposing the rear face of the lowermost pivoted file pocket and the front face of the underlying file pocket.

2. The method as set forth in claim 1 wherein the E-shaped channel member is applied to the base member along at least the side and front edges thereof in the form of segments dimensioned to extend from corner to corner of the rectangular base member.

3. The method as set forth in claim 1 wherein the E-shaped channel member has an overall length at least equal to the sum of the lengths of the front and side edges of the rectangular base member; the E-shaped portion of the channel member is vertically cut at two spaced points corresponding to the front corners of the base member so as to entirely sever the lower, intermediate and upper legs thereof while leaving the vertical flange intact; and, the E-shaped channel member is applied to the base member by positioning the laterally extending flange on the base member in the lower longitudinal slot of the channel member and the channel member is wrapped around the base member with the unsevered vertical flange being folded through an angle of 90° at each front corner of the base member.

4. The method as set forth in claims 1, 2 or 3 wherein the E-shaped channel member comprises an extrusion formed of plastic material.

5. The method as set forth in claim 4 wherein the laterally extending flange on the rectangular base member comprises sheet plastic material bonded in the lower longitudinal slot of the E-shaped channel member.

6. The method as set forth in claim 4 wherein the laterally extending flange on the base member is solvent bonded in the lower longitudinal slot in the channel member.

7. The method as set forth in claims 1, 2 or 3 wherein a top plate is hingedly mounted on the rear edge of the base member for protecting the "n" file pockets.

8. The method as set forth in claims 1, 2 or 3 wherein the E-shaped channel member defines a laterally projecting flange on each side of the file pocket support panel for permitting slidable mounting of the support panel within opposed complimentally shaped tracks in a file cabinet.

* * * * *